G. CONSTANTINESCO.
MEANS FOR COMPENSATING FOR LEAKAGE IN WAVE TRANSMISSION SYSTEMS.
APPLICATION FILED JAN. 5, 1916. RENEWED AUG. 25, 1919.
1,334,287.
Patented Mar. 23, 1920.
2 SHEETS—SHEET 1.
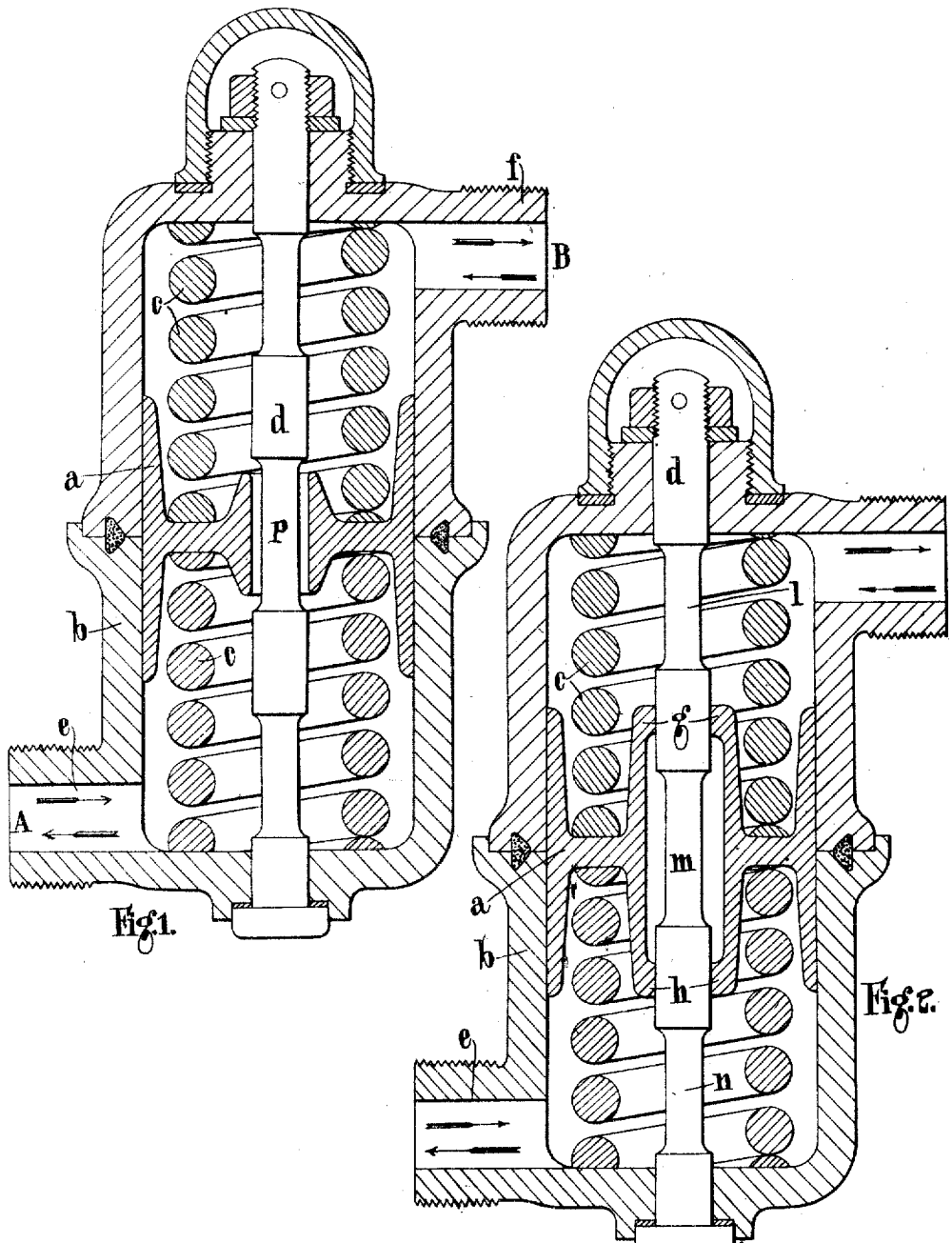

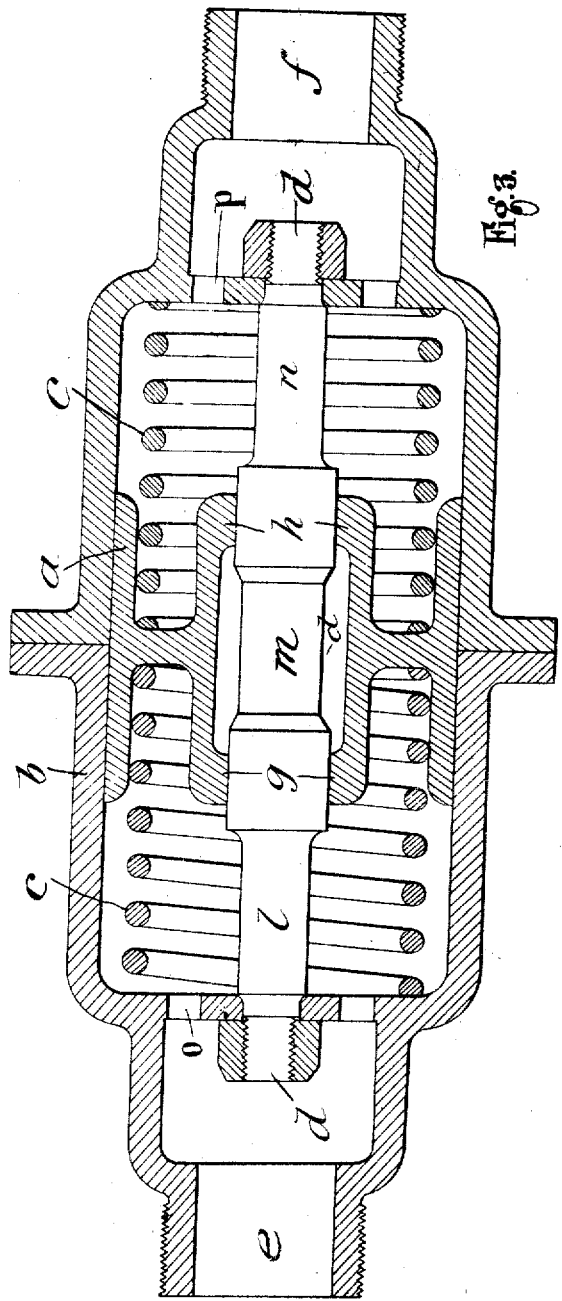

UNITED STATES PATENT OFFICE.

GOGU CONSTANTINESCO, OF ALPERTON, ENGLAND, ASSIGNOR OF ONE-HALF TO WALTER HADDON, OF LONDON, ENGLAND.

MEANS FOR COMPENSATING FOR LEAKAGE IN WAVE-TRANSMISSION SYSTEMS.

1,334,287.   Specification of Letters Patent.   Patented Mar. 23, 1920.

Application filed January 5, 1916, Serial No. 70,551. Renewed August 25, 1919. Serial No. 319,646.

*To all whom it may concern:*

Be it known that I, GOGU CONSTANTINESCO, a subject of the King of Great Britain and Ireland, residing at "Westoe," Stanley avenue, Alperton, in the county of Middlesex, England, have invented certain new and useful Improved Means for Compensating for Leakage in Wave-Transmission Systems, of which the following is a specification.

The present invention relates to systems for transmitting power by wave motion, of the kind described in British Patents Nos. 9029 of 1913 and 12438 of 1914, and particularly to the compensation for leakage of liquid from the pipes in such systems. If a system of pipes containing liquid, forming a transmission line for the transmission of energy by wave motion is required to work for an indefinite period, and there is leakage in the line, either accidental or for a fixed purpose, such as washing out borings or the like, and if it is not desired to provide separate sources for the supply of liquid at intervals along the line, it is necessary to provide some means by which a continuous or intermittent flow of liquid is allowed in the line, so that liquid may be supplied from any convenient point.

In wave transmission systems, in order to compensate for inertia, or increase inertia, or transform from high pressure to low pressure, instruments are employed which depend for their action on dividing the liquid column, and therefore such instruments do not, unless specially constructed, allow the continuous or intermittent flow of liquid which may be required.

The present invention has for its object to provide suitable means whereby the normal function of condensers, inertia devices and transformers is not interfered with, while at the same time, continuous or intermittent flow of liquid through the line is allowed.

The invention consists broadly in constructing the devices dividing the liquid column in such a manner that at given positions in their stroke, a flow of liquid is permitted in the transmission pipe from one side of such instrument to the other, such flow being cut off by the movement of the oscillating body.

The invention further consists in a condenser constructed so that in the mean position a flow of liquid is allowed from one side to the other.

The invention also consists in a condenser so constructed that toward the end of its stroke a flow of liquid is permitted.

The invention also consists in the improved means for allowing the flow of liquid from one side of the dividing apparatus to the other, hereinafter described.

It will be seen that in order to allow a flow from one side to the other, it is only necessary that an aperture should be provided in a diaphragm, if such is used as the dividing apparatus, or if pistons are employed, clearance may be allowed around the piston. This, however, would give rise to loss of power, and according to the present invention, the flow of liquid is permitted without interfering much with the transmission of power.

Referring to the accompanying diagrammatic drawings—

Figure 1 shows a condenser in which the flow is cut off by the movement of the piston from the mean position.

Fig. 2 shows a condenser in which the communication is opened at the end of the stroke of the oscillating body.

Fig. 3 shows a modified form of this arrangement.

In carrying the invention into effect according to the form shown in Fig. 1, the condenser comprises a piston $a$, held in a mean position, in the cylinder $b$, by springs $c, c$. The piston is provided with a central aperture to allow it to work on a central rod $d$, having a cut away portion $p$ forming with the piston a valve. The transmission pipes are connected at $e$ and $f$ respectively, so that the condenser, except when in or close to the mean position, divides the liquid column between these two points. In this arangement, any appreciable movement of the piston $a$ from the mean position cuts off the communication between the pipes $e$ and $f$.

It will be noticed that in the case of a condenser or inertia device, the alternating pressure difference on the two sides of the piston is a maximum at the ends of the stroke, while for the mean position the difference of pressure is zero, so that the flow at the mean position will only depend on the mean pressures. It follows therefore that at each passage of the piston through the mean position, an opportunity is given for the mean pressures on the two sides of the piston to become equal.

It will be seen that with a condenser as above described, if the leakage is excessive on one side, the mean pressure rises on the opposite side, and the piston tends to move toward the leaky side, and at a certain period of the movement of the piston toward this side, the passage through the piston is completely closed, and does not again open. This property is of importance, as it prevents the whole line being put out of action in the event of a breakage occurring on one side of the condenser. The condenser in such case operates automatically to cut off from the remaining portion of the system that part of the line in which the breakage has occurred.

An inertia device may be arranged in a similar manner to operate so that it cuts off any portion of the line in which a breakage or other large leakage occurs.

In the arrangement shown in Fig. 2, the piston $a$ is formed with a bridge, having bearing surfaces $g$, $h$, traveling over the central rod $d$, which in this case is provided with three grooves or cut away portions, $l$, $m$, $n$. In this case, the condenser can move a certain distance from the mean position, without allowing any flow of liquid from one side to the other of the piston. If, however, leakage occurs on one side, the mean pressure on this side diminishes, and the mean position of the piston travels toward this side. The liquid will thus flow through the piston at the ends of the stroke until the mean pressures are again balanced.

Fig. 3 shows a condenser arranged for the same purpose, constructed somewhat differently, in order to get the axis of the condenser corresponding with the direction of the pipe line in which it is inserted.

In installations in which the flow due to leakage is always in one direction, the condensers or inertia devices may be simplified, by dispensing with one end of the central bar $d$. This is usually convenient in cases where one generator drives several receivers, a liquid supply pump being provided only at the generator end. Where a number of generators are working in parallel at different points on the line, condensers and inertia devices should be capable of working in both directions, as the leak may occur in either direction.

It will be seen that according to the invention, condensers or inertia devices or other dividing apparatus may be provided with a permanent leak, provided that leak is small, and efficiency is not of great importance.

In the case where a condenser or other apparatus having a mean position leak is employed, in order to start a repaired line which has been cut off by the condenser or the like after a breakage, it is first necessary to fill the required line with liquid at the normal mean pressure, in order to bring the oscillating body back to its mean position.

With regard to the forms of the invention in which the leak occurs at the ends of the stroke, this is specially suitable where considerable leakages are to be dealt with, and where high efficiency is required in the no-leakage condition. This method, however, takes more power for a given leak than the mean position arrangements which, however, are less economical under no-leakage conditions. The reason for this is that under what we may call the mean position balancing method, shown in Fig. 1, the exchange of liquid due to leakage is at a small difference of alternating pressure, thus absorbing little energy, but absorbing this energy whether the leakage occurs or not; while with what we may call the end stroke balancing method, shown in Figs. 2 and 3, the liquid flows from one side to the other under the maximum difference of pressure, thus absorbing more power in proportion to the leakage. If, however, no leakage occurs, this loss of power is zero.

Having now described my invention, what I claim as new and desire to secure by Letters Patent is:—

1. In wave transmission systems, a chamber, a piston in said chamber adapted to oscillate about a mean position, a passage leading from one side of said piston to the other and fixed means adapted to close said passage at a given point of the stroke of said piston, as and for the purpose described.

2. In wave transmission systems, a chamber, a piston in said chamber adapted to oscillate about a mean position, a passage leading from one side of said piston to the other, springs adapted to hold said piston in a mean position, and fixed means adapted to close said passage at a given point of the stroke of said piston, as and for the purposes described.

In testimony whereof I have signed my name to this specification.

GOGU CONSTANTINESCO.